United States Patent [19]

Falk

[11] 4,058,136

[45] Nov. 15, 1977

[54] PRESSURE DISTRIBUTION VALVE

[75] Inventor: Edward J. Falk, St. Louis County, Mo.

[73] Assignee: Wagner Electric Corporation, Parsippany, N.J.

[21] Appl. No.: 732,803

[22] Filed: Oct. 15, 1976

[51] Int. Cl.² .......................................... G05D 11/03
[52] U.S. Cl. .................................... 137/110; 303/6 C
[58] Field of Search .......................... 303/6 C; 188/349; 137/110; 60/591

[56] References Cited

U.S. PATENT DOCUMENTS

| | | | |
|---|---|---|---|
| 3,480,333 | 11/1969 | Stelzer | 303/6 C |
| 3,603,648 | 9/1971 | Reznicek et al. | 303/6 C |
| 3,612,618 | 10/1971 | Swanson | 303/6 C |
| 3,768,869 | 10/1973 | Bueler et al. | 303/6 C |
| 3,817,584 | 6/1974 | Huston et al. | 303/6 C |

Primary Examiner—Trygve M. Blix
Assistant Examiner—Edward R. Kazenske
Attorney, Agent, or Firm—Eyre, Mann, Lucas & Just

[57] ABSTRACT

A brake pressure distribution valve distributes fluid pressure to front brakes in proportion to fluid pressure distributed to rear brakes, and in addition, "holds off" the pressure distribution to the front brakes for delayed distribution thereto. The valve includes a housing having a cavity formed therein. Inlet and outlet ports permit fluid to flow into and out of the cavity. A first piston engages a metering seal to normally close one fluid passage and to cut off fluid communication between inlet and outlet ports. Another fluid passage is normally open to establish fluid communication between the inlet and outlet ports. Due to a fluid pressure buildup, a closing member is actuated to close the other passage thus holding off pressure distribution to the front brakes. As the fluid pressure buildup continues the one passage opens to re-establish fluid communication between the inlet and outlet ports. The valve may be used in a vehicle brake system in cooperation with a master cylinder, front disc brakes and rear drum brakes.

8 Claims, 4 Drawing Figures

PRESSURE DISTRIBUTION VALVE

BACKGROUND OF THE INVENTION

1. Field of the Invention

The present invention generally concerns fluid pressure brake and analogous systems and more particularly concerns multiple fluid receiving points involving front and rear brake pressure modifying.

2. Discussion of the Prior Art

Generally, brake pressure distribution (BPD) valves predeterminately control pressurized fluid to vehicle brakes to vary vehicle brake torque distribution dependent on vehicle deceleration levels. Valves of this type are for the purpose of providing substantially equal pressure distribution to the front and rear brakes when the brake system is operating below a certain predetermined pressure. This type of valve is compatible with a brake system having front and rear axle drum brakes.

Due to the use of shoe return springs, drum brakes require an initial pressure to overcome the opposing forces of the shoe return springs before any braking action occurs. Disc brakes generally do not have such return springs and therefore do not require the initial pressure to overcome such spring forces. As a result, when exposed to the same applied pressure, disc brakes will initially respond to applied pressure faster than drum brakes. Therefore, in a hybrid braking system, such as one including front axle disc brakes and rear axle drum brakes, equal pressure distribution below certain predetermined pressures is undesirable since the faster initial response to pressure application of the disc brakes would result in an initial imbalance of braking force between the front and rear brakes. That is, the front axle disc brakes would initially respond to applied pressure prior to a similar response by the rear axle drum brakes thus creating the possibility of initial front disc brake application prior to the rear drum brake application. Such imbalance could cause premature front axle lock-up on low friction road surfaces and could also cause a higher front brake wear rate.

To overcome these undesirable effects, it would be beneficial to provide unequal brake pressure distribution below certain predetermined pressures by providing a valve capable of initially delaying or restricting the pressure application to the front disc brakes while permitting unrestricted pressure application to the rear drum brakes to overcome the opposing force of the return springs. The desired result would be substantially simultaneous application of both the front disc and rear drum brakes.

SUMMARY OF THE INVENTION

Accordingly, the present invention provides a brake pressure distribution valve for predeterminately controlling braking pressure resulting in unequal brake pressure distribution below certain predetermined pressures by providing a valve capable of initially delaying or restricting the pressure application to the front disc brakes while permitting unrestricted pressure application to the rear drum brakes. The foregoing is accomplished by providing a housing having a cavity formed therein. Inlet and outlet ports are formed in the housing to permit fluid to enter and exit the cavity. A metering seal is mounted in the cavity between a first cavity portion adjacent the inlet port and a second cavity portion adjacent the outlet port. A first fluid pressure responsive member is resiliently mounted in the cavity for relative movement into and out of engagement with the metering seal. A second fluid pressure responsive member extends through the first member for relative and concerted movement therewith. A first passage is normally open and extends through the first member for fluidly interconnecting the first and second cavity portions. A second passage is normally closed and is operable upon concerted movement of the first and second fluid responsive members for fluidly interconnecting the first and second cavity portions. The second fluid pressure responsive member carries a check valve member for sealingly closing the first passage upon relative movement between the first and second fluid pressure responsive members thus holding off pressure distribution to the front brakes. The valve may be used in a vehicle brake system of the type including a master cylinder, front disc brakes, rear drum brakes and conduit interconnecting the master cylinder with the front and rear brakes. The valve may be interconnected with conduit between the master cylinder and the front brakes.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
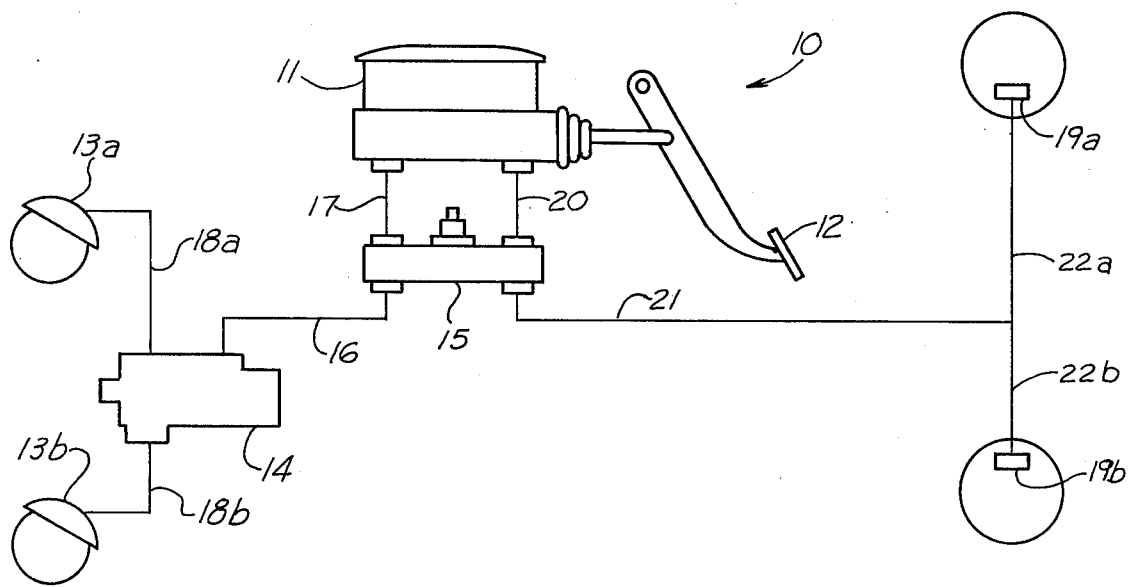
FIG. 1 is a diagrammatic illustration of a brake system including the novel valve of this invention.

Referring now to the drawings, FIG. 1 generally illustrates a portion of a vehicle brake system designated 10 including brake system components such as master cylinder 11 and brake pedal 12 operably connected thereto. Brake fluid in the master cylinder is conducted to front disc brakes 13a, 13b via conduit 17, warning valve 15, conduit 16, brake pressure distribution valve 14 and branch conduits 18a, 18b. Brake fluid is similarly conducted to rear drum brake cylinders 19a, 19b via conduit 20, warning valve 15, conduit 21 and branch conduits 22a, 22b.

Figure 2:
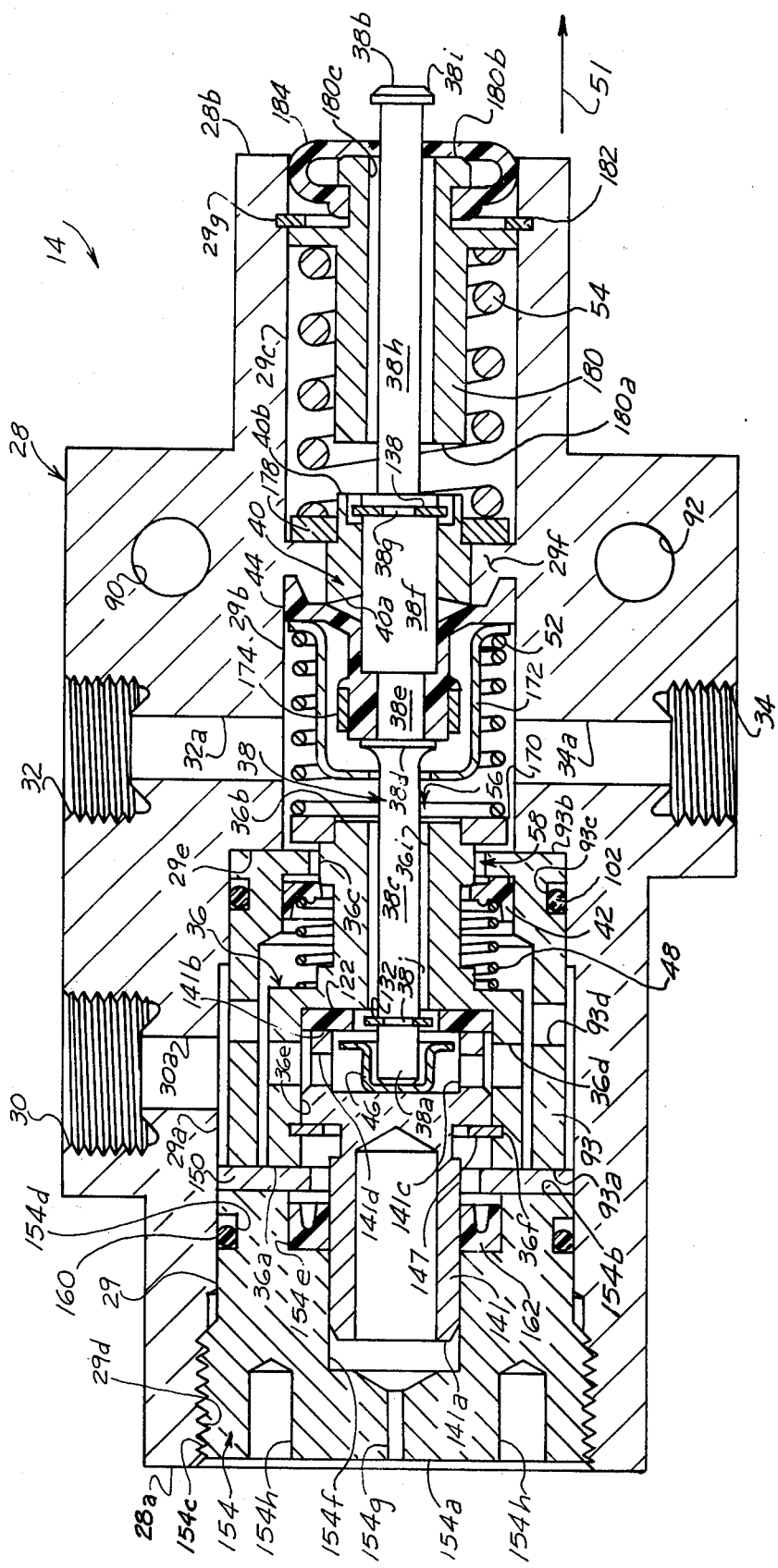
FIG. 2 is a cross-sectional side view of the novel valve of this invention.

In FIG. 2, the novel brake pressure distribution valve of this invention is generally designated 14. The valve includes housing 28 having threaded inlet port 30 and threaded outlet ports 32, 34. Also, housing 28 includes cavity 29 containing first, second and third fluid pressure responsive piston members 36, 38, 40, respectively. Cavity 29 includes first cavity portion 29a adjacent inlet port 30, second cavity portion 29b adjacent outlet ports 32, 34, and third cavity portion 29c. Metering seal 42 is located generally between first and second cavity portions 29a, 29b, respectively. Sealing diaphragm 44 is generally located between second and third cavity portions 29b, 29c, respectively. A tophat shaped valve element 46 is carried by second fluid pressure responsive member 38. First resilient member or spring 48 is compressed between first piston 36 and metering seal 42 to exert forces thereon. Second resilient member or spring 52 is compressed between first piston 36 and diaphragm 44 for exerting forces thereon. Third resilient member or spring 54 is compressed between third piston 40 and an end cap 180 for exerting forces thereon. A first fluid passage 56 interconnects first and second cavity portions 29a, 29b, respectively, when fluid passes through bore 36i formed in member 36. A second fluid passage 58 interconnects first and second cavity portions 29a and 29b, respectively, when first fluid pressure responsive member 36 and metering seal 42 are separated by fluid passing therebetween. First, second and third fluid pressure responsive members 36, 38 and 40, respectively, and valve element 46 are mounted in cavity 29 and each is provided for either independent or concerted relative movement.

More specifically now, valve 14 comprises housing 28 preferably formed of aluminum and including main cavity 29 formed therethrough having its longitudinal axis interconnecting first end 28a and second end 28b. Cavity 29 generally includes three cylindrical portions designated first cavity portion 29a adjacent first end 28a, relatively reduced diameter second cavity portion 29b formed adjacent first portion 29a, and third portion 29c formed between second portion 29b and second end 28b.

Threaded inner peripheral portion 29d of first cavity portion 29a is formed immediately adjacent first end 28a. First cavity portion 29a is separated from second cavity portion 29b at shoulder 29e. Second cavity portion 29b is separated from third cavity portion 29c at flange 29f. Peripheral groove 29g is formed in cavity 29 adjacent second end 28b. Inlet bore 30a intersects cavity 29 at first portion 29a. Outlet bores 32a, 34a intersect cavity 29 at second portion 29b. Bores 90, 92 are formed through housing 28 having axes transverse to the axis of cavity 29. The bores are provided for mounting housing 28 by the use of bolts or the like.

Annular aluminum sleeve 93 is provided in cavity portion 29a with a first end 93a and a second end 93b. Radially directed annular groove 93c is formed in sleeve 93 for mounting rubber O-ring 102 therein in sealing engagement with cavity portion 29a. Annular rubber metering seal 42 is mounted in sleeve 93 adjacent second end 93b. Sleeve 93 also includes a plurality of radially directed bores 93d formed therein.

Annular aluminum first fluid pressure responsive member or piston 36 is provided in cavity portion 29a within sleeve 93. First end 36a of piston 36 terminates adjacent first end 93a of sleeve 93. Second end 36b of piston 36 protrudes past second end 93b of sleeve 93 and into second cavity portion 29b. Radially extending annular flange 36c adjacent second end 93b is provided for cooperative association with metering seal 42. Spring member 48 is compressed between piston 36 and metering seal 42. Spring 48 is preferably of tinned music wire and urges metering seal 42 into position with sleeve 93. A plurality of radially directed bores 36d are formed in piston 36 similar to those formed in sleeve 93. Rubber valve seat 122 is situated in abutting relationship with piston 36. Axially directed bores 36e, 36i join to extend from first end 36a to second end 36b. Radially directed annular retainer ring groove 36f is formed in the piston 36 and is axially spaced between first end 36a and radial bores 36d.

Piston member 141 is preferably of aluminum and is generally cylindrical including first end 141a and second end 141b which includes axially directed annular blind counterbore 141c formed therein. A plurality of radially directed bores 141d are formed to intersect with blind bore 141c. Steel retainer ring 147 is positioned in groove 36f and retains second end 141b of member 141 in abutting relationship with valve seat 122. Aluminum end cap or plug 154 is generally cylindrical and includes first end 154a and second end 154b. Outer annular peripheral portion 154c is threaded for mating engagement with similarly threaded peripheral portion 29d of housing 28. Annular groove 154d is provided in cap 154 for mounting rubber O-ring 160 therein in sealing engagement with housing 28. Second end 154b includes axially directed bore 154e for mounting annular rubber seal 162 and axially directed bore 154f is for accommodating first end 141a of member 141 in sealing engagement with rubber seal 162. Axially directed bore 154g vents bore 154f to atmosphere. Bores 154h are formed in first end 154a to accommodate a well-known spanner wrench used to threadedly position cap 154 in bore 29. Substantially flat, washer-like steel ring 150 is sandwiched between second end 154b of end cap 154 and first ends 93a and 36a of sleeve 93 and piston 36 respectively.

Piston 38 is an elongated cylindrical shaft-like member of varying diameters along its longitudinal axis. Piston 38 is preferably of stainless steel. First end 38a of piston 38 is of a first diameter for accommodating a floating-fit relationship with tophat shaped check valve element 46 for relative or concerted movement therewith. Annular groove 38j is formed into piston 38 for accommodating steel retaining ring 132. A portion 38c of piston 38 extends from first cavity portion 29a through bore 36i of piston 36 in relatively movable relationship therewith. Flange 38d is formed on piston 38 in second cavity portion 29b. A further portion 38e of piston 38 extends from flange 38d and terminates at enlarged diameter portion 38f. The enlarged diameter portion 38f terminates at annular groove 38g for accommodating steel retaining ring 138. A further portion 38h of piston 38 extends from groove 38g through third cavity portion 29c and terminates at nub 38i formed on the piston at its second end 38b.

Second end 36b of piston 36 protrudes beyond metering seal 42 into second cavity portion 29b where washer-like steel spring retainer 170 is axially urged into abutment with flange 36c of piston 36 by spring 52 preferably formed of tinned music wire. Annular rubber diaphragm 44 is seated in cavity portion 29b. Spring 52 urges bell-shaped steel spring retainer 172 into contact with diaphragm 44 which in turn urges diaphragm 44 into sealing engagement with housing flange 29f. Bell-shaped retainer 172 engages portion 38c of piston 38. Diaphragm 44 sealingly engages reduced diameter portion 38e of piston 38. A brass clamp ring 174 maintains diaphragm 44 in sealing engagement around piston 38.

Third piston 40 is slidably engaged around portion 38f of piston 38 and is also slidably engaged within housing flange 29f. First end 40a of piston 40 is adjacent diaphragm 44 and second end 40b engages retainer ring 138, retained in annular groove 38g, when relative movement occurs between pistons 38 and 40. Tinned music wire spring 54 urges steel retainer ring 178 into second end 40b of piston 40 and also into abutment with housing flange 29f.

Aluminum end cap 180 is generally cylindrical and includes first end 180a and second end 180b interconnected by central annular bore 180c. Annular groove 29g is provided to accommodate retainer ring 182 for retaining cap 180 in third cavity portion 29c. Spring 54 urges cap 180 into contact with retaining ring 182. Extended portion 38h of piston 38 extends through bore 180c of end cap 180. Rubber boot 184 is sealingly engaged with cap 180 and with extended portion 38h of piston 38 adjacent nub 38i.

Figure 4:
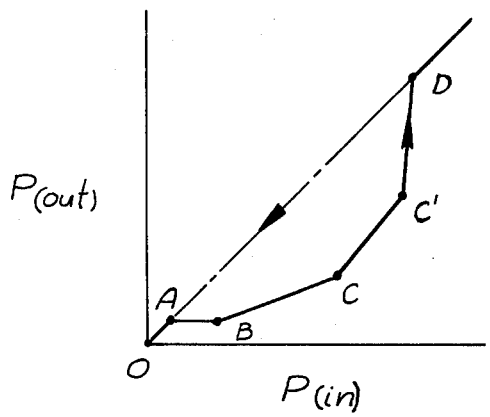
FIG. 4 is a graphical illustration of a pressure curve resulting from use of the novel valve of this invention.

In operation, with the valve 14 assembled as illustrated in FIG. 2 and connected in the vehicle brake system of FIG. 1, it can be seen that fluid enters inlet port 30 at an initial pressure designated P(in) and flows through bore 30a into first cavity portion 29a. Initially fluid can flow along first path 56 from first cavity portion 29a past bores 93d, 36d, 141d, past tophat valves 46, through bore 36i to second cavity portion 29b and thus to outlet ports 32, 34 at a pressure designated P(out). Fluid communication through passage 58 between first portion 29a and second portion 29b is blocked due to the sealing engagement of metering seal 42 and first piston 36. As fluid pressure increases it acts on diaphragm 44 which is connected to piston 38. At this point P(in) = P(out) as illustrated on the pressure curve of FIG. 4 by line O-A.

When the pressure acting on the effective area of diaphragm 44, FIG. 2, is sufficient to move piston 38 to the right as designated by the arrow 51 to partially draw first end 38a to the right as viewed in the drawing, this permits tophat valve 46 to engage seal 122 thus closing first path 56 and closing off fluid communication between cavity portions 29a, 29b. The closing pressure of valve 46 can be predetermined by the stiffness of rubber diaphragm 44, and is generally desired to be some value below 15 psi. At this point the rate of increase in P(in) is greater than the rate of P(out) which is negligible as illustrated on the pressure chart of FIG. 4 as the line A-B. This closing action of valve 46 temporarily holds off fluid pressure from the front brakes.

As inlet pressure P(in) builds in first portion 29a the outlet pressure P(out) remains substantially constant until P(in) overcomes the force of springs $S_1$ and $S_2$ or 48, 52. The force exerted by spring 48 is intended to be only that magnitude necessary to assure the positioning of metering seal 42 against flange 36c to maintain a sealing relationship therebetween. When P(in) overcomes the forces of springs $S_1$ and $S_2$ or 48, 52 then first piston 36 will move to the right thus opening second path 58 between metering seal 42 and flange 36c thus re-establishing fluid communication between first and second portions 29a, 29b respectively. An increase in P(in) is now accompanied by a proportional increase in P(out). At this point, the proportional pressure increases of P(in) and P(out) are illustrated on the pressure curve of FIG. 4 as line B-C and it can be seen that the rate of change of P(out) is increasing in relation to P(in).

Figure 3:
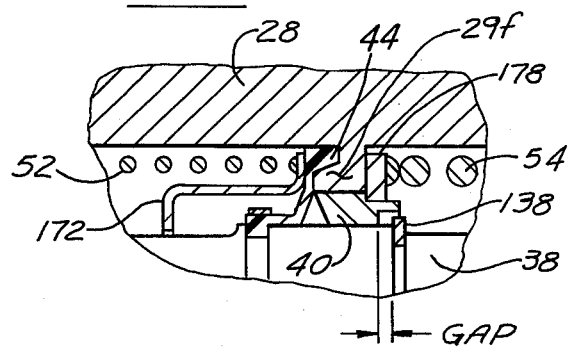
FIG. 3 is an exploded partial cross-sectional side view of a specific portion of the novel valve of this invention.

P(out) will continue to increase in accordance with the above-stated relationship with P(in) until the output pressure overcomes the force of spring $S_3$ or 54 and moves piston 40 toward abutable engagement with retainer ring 138 fixedly mounted on piston 38. At this point, the proportional pressure increases of P(in) and P(out) are illustrated on the pressure curve of FIG. 4 as line C-C' and it can be seen that the rate of change of P(out) has further increased in relation to P(in). By referring to FIG. 3, the width of the gap between piston 40 and ring 138 is the controlling factor for the position of point C' on FIG. 4 and it has been determined that decreasing the gap width will shorten the line C-C' whereas increasing the gap width will lengthen the line C-C'.

Once piston 40 engages ring 138 (at point C') the pistons 38 and 40 act to move to the right in unison. At this point, the proportional pressure increases of P(in) and P(out) are illustrated on the pressure curve of FIG. 4 as line C'-D and it can be seen that the rate of change of P(out) has still further increased in relation to P(in).

Eventually P(out) becomes equal to P(in). This condition is generally referred to as the pressure blend point (point D on the chart of FIG. 4). At input pressures above the blend point, the input/output relationship will be a 1/1 ratio. Upon release or decreasing input pressure, P(out) will follow P(in) on a 1/1 ratio as illustrated by line DA since direct communication exists in the reverse flow direction due to the capability of the fluid to pass through second passage 58 past the metering seal 42 and through the first passage 56 via bore 36i past one-way tophat shaped check valve 46.

The foregoing has described a novel brake pressure distribution valve for holding off distribution of fluid pressure to front brakes in proportion to fluid pressure distributed to the rear brakes. The valve may be used in a vehicle brake system in cooperation with a master cylinder, front disc brakes and rear drum brakes.

Modifications and variations of the present invention are possible in the light of the above teachings. It is therefore to be understood that within the scope of the appended claims the invention may be practiced otherwise than as specifically described.

I claim:
1. A pressure distribution valve comprising:
   a. a body;
   b. inlet means for supplying fluid pressure to said body;
   c. outlet means for receiving fluid pressure from said body;
   d. first means for providing open fluid communication between said inlet means and said outlet means during the occurrence of fluid pressure between zero and a first predetermined fluid pressure at said inlet means;
   e. means for substantially blocking fluid communication between said inlet means and said outlet means during the occurrence of fluid pressure between said first predetermined fluid pressure and a second predetermined fluid pressure, said second predetermined fluid pressure being higher than said first predetermined fluid pressure;
   f. first means for metering fluid pressure from said inlet means to said outlet means in a first ratio when the fluid pressure at said inlet means is between said second predetermined fluid pressure and a third predetermined fluid pressure, said third predetermined fluid pressure being higher than said second predetermined fluid pressure;
   g. second means for metering fluid pressure from said inlet means to said outlet means in a second ratio when the fluid pressure at said inlet means is between said third predetermined fluid pressure and a fourth predetermined fluid pressure, said fourth predetermined pressure being higher than said third predetermined fluid pressure;
   h. third means for metering fluid pressure from said inlet means to said outlet means in a third ratio to the fluid pressure at said inlet means during the occurrence of fluid pressures at said inlet means between said fourth fluid pressure and a fifth fluid pressure, said fifth fluid pressure being greater than said fourth fluid pressure;

i. said third ratio being greater than said second ratio and said second ratio being greater than said first ratio; and j. second means for providing open fluid communication between said inlet means and said outlet means when the fluid pressure at said inlet means is greater than said fifth fluid pressure.

2. The pressure distribution valve recited in claim 1 wherein said means for substantially blocking comprises:
   a. a valve member moveable in said body flow-wise intermediate said inlet and outlet means; and
   b. a fluid pressure responsive means in said body for moving said valve member into sealing engagement with said first means for providing open fluid communication upon the occurrence of said first predetermined fluid pressure.

3. The pressure distribution valve recited in claim 1 wherein said first means for metering comprises:
   a. a metering seal in said body flow-wise intermediate said inlet and outlet means;
   b. a fluid pressure responsive metering member moveable in said body;
   c. said fluid pressure responsive metering member being in sealing engagement with said metering seal during fluid pressure at said inlet means of less than said second predetermined fluid pressure; and
   d. said fluid pressure responsive metering member being operative to meter fluid pressure between said inlet and outlet means in said first ratio during the occurrence of fluid pressure at said inlet means of between said first and second predetermined fluid pressures.

4. The pressure distribution valve recited in claim 3 further comprising:
   a. a bore;
   b. said bore providing fluid communication between said inlet means and said outlet means;
   c. a first fluid pressure responsive means in said body;
   d. said first fluid pressure responsive means being connected to a sealing means; and
   e. said first fluid pressure responsive means being operative to move said sealing means into sealing relationship with said bore upon the occurrence of fluid pressures at said inlet means equal to and greater than said first predetermined fluid pressure.

5. The pressure distribution valve recited in claim 4 wherein said second means for metering fluid pressure comprises:
   a. a second fluid pressure responsive means moveably disposed in said body;
   b. resilient means coupling said second fluid pressure responsive means to said first fluid pressure responsive means;
   c. said second fluid pressure responsive means being resiliently biased against movement during the occurrence of fluid pressure at said inlet means of less than said third predetermined fluid pressure and being operative to move in proportion to fluid pressure equal to and greater than said third predetermined fluid pressure; and
   d. retaining means on said first fluid pressure responsive means abutting said fluid pressure responsive metering member for additively urging said metering member in the direction which permits fluid pressure to be metered from said inlet means to said outlet means in a greater ratio.

6. The pressure distribution valve recited in claim 5 further comprising:
   a. a second retaining means on said first fluid pressure responsive means and;
   b. said second pressure responsive means being operative to abut said second retaining means at a fluid pressure at said inlet means equal to and greater than a fourth fluid pressure.

7. The pressure distribution valve recited in claim 3 wherein said second means for providing open fluid communication comprises means for moving said fluid pressure responsive metering member out of sealing contact with said metering seal.

8. A pressure distribution valve comprising:
   a. a body;
   b. inlet means for connecting fluid pressure to said body;
   c. outlet means for connecting fluid pressure from said body;
   d. a proportioning valve in said body comprising:
      i. a metering seal flow-wise intermediate said inlet and outlet means;
      ii. a metering member moveable in said body;
      iii. said metering member being operative to sealingly abut said metering seal below a first predetermined fluid pressure at said inlet means, and further operative to meter fluid pressure to said outlet means in a first predetermined ratio at fluid pressures at said nlet means between said first predetermined fluid pressure and a second predetermined fluid pressure higher than the first predetermined fluid pressure;
   e. communicating means for communicating fluid pressure from said inlet means to said outlet means;
   f. a first fluid pressure responsive member moveably disposed in said body;
   g. sealing means attached to said first fluid pressure responsive member;
   h. said first fluid pressure responsive member being operative to move said sealing means into sealing engagement with said communicating means at fluid pressures in said inlet means equal to and greater than a third predetermined fluid pressure greater than zero and lower than either of said first and second predetermined fluid pressures;
   i. a second fluid pressure responsive member moveably disposed within said body;
   j. said second fluid pressure responsive member being resiliently biased into a fixed position at fluid pressure less than a said second predetermined fluid pressure;
   k. said second fluid pressure responsive member being urged into proportionate motion at fluid pressure equal to and greater than said second predetermined fluid pressure;
   l. resilient means for coupling motion of said second fluid pressure responsive member to said first fluid pressure responsive member;
   m. first retaining means on said first pressure responsive member;
   n. said first retaining means contacting said metering member and urging said metering member in a direction tending to increase the pressure in the outlet means;
   o. second retaining means on said first pressure responsive member;
   p. means on said second fluid pressure responsive member for abutting said second retaining means upon the occurrence in said inlet means of fluid pressure equal to and greater than a fourth predetermined fluid pressure;
q. said fourth predetermined fluid pressure being greater than said first, second, and third fluid pressures; and
r. said metering member being operative to fully disengage said metering seal upon the occurrence of a fluid pressure in said inlet means equal to and greater than a fifth predetermined fluid pressure greater than said fourth predetermined fluid pressure.

* * * * *